(12) United States Patent
Yang et al.

(10) Patent No.: US 11,088,376 B2
(45) Date of Patent: Aug. 10, 2021

(54) CONTROLLING METHOD AND DEVICE OF FUEL CELL SYSTEM WITH MULTIPLE STACK TOWERS

(71) Applicant: INDUSTRIAL TECHNOLOGY RESEARCH INSTITUTE, Hsinchu (TW)

(72) Inventors: Cheng-Hao Yang, Tainan (TW); Shing-Cheng Chang, Kaohsiung (TW); Heng-Ju Lin, Tainan (TW); Chia-Hsin Lee, Tainan (TW); Chien-Chang Hung, Pingtung (TW); Wen-Sheng Chang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 240 days.

(21) Appl. No.: 16/202,335

(22) Filed: Nov. 28, 2018

(65) Prior Publication Data
US 2020/0168921 A1    May 28, 2020

(30) Foreign Application Priority Data
Nov. 22, 2018 (TW) .................. 107141639

(51) Int. Cl.
*H01M 8/04* (2016.01)
*H01M 8/0432* (2016.01)
(Continued)

(52) U.S. Cl.
CPC ....... *H01M 8/0432* (2013.01); *H01M 8/0491* (2013.01); *H01M 8/04395* (2013.01); *H01M 8/04753* (2013.01); *H01M 8/249* (2013.01)

(58) Field of Classification Search
CPC ........... H01M 8/0432; H01M 8/04395; H01M 8/04753; H01M 8/0491; H01M 8/249
See application file for complete search history.

(56) References Cited

U.S. PATENT DOCUMENTS 6,830,844 B2   12/2004   Keegan
7,258,936 B2    8/2007   Zheng et al.
(Continued)

FOREIGN PATENT DOCUMENTS

CN        1877953 A    12/2006
CN     102142573 A     8/2011
(Continued)

OTHER PUBLICATIONS

China Patent Office, 201811457050.7, "Office Action", dated Oct. 26, 2020, China.

(Continued)

*Primary Examiner* — Jane J Rhee
(74) *Attorney, Agent, or Firm* — Locke Lord LLP; Tim Tingkang Xia, Esq.

(57) ABSTRACT

A controlling device of a fuel cell system with multiple stack towers and a controlling method thereof are provided. The controlling device comprises a temperature sensing equipment, a processor and a pulse width modulation circuit. The fuel cell system comprises multiple fuel cell stacks. The controlling method further comprises: calculating an average temperature of the fuel cell stacks based on the temperatures of the fuel cell stacks by the temperature sensing equipment; determining whether differences between the average temperature and the temperatures of the fuel cell stacks fall within a preset range of average temperature difference by the processor, and adjusting an output current of at least one of the fuel cell stacks by the pulse width modulation circuit commanded by the processor when the difference between the average temperature and the temperature of the at least one fuel cell stack falls outside the preset range of average temperature difference.

9 Claims, 7 Drawing Sheets

(51) Int. Cl.
  *H01M 8/04858* (2016.01)
  *H01M 8/249* (2016.01)
  *H01M 8/0438* (2016.01)
  *H01M 8/04746* (2016.01)

(56) References Cited

U.S. PATENT DOCUMENTS

| | | | | |
|---|---|---|---|---|
| 2007/0184315 A1* | 8/2007 | Kelly | ............ | H01M 8/0491 429/431 |
| 2008/0171239 A1 | 7/2008 | Tucker et al. | | |
| 2017/0301934 A1 | 10/2017 | Higdon et al. | | |
| 2018/0019487 A1* | 1/2018 | Bozzolo | ............ | H01M 8/04776 |

FOREIGN PATENT DOCUMENTS

| | | |
|---|---|---|
| CN | 102449833 A | 5/2012 |
| CN | 102569938 A | 7/2012 |
| CN | 103339773 A | 10/2013 |
| CN | 107210462 A | 9/2017 |
| JP | 2007220559 A | 8/2007 |
| TW | 558852 B | 10/2003 |
| TW | I453985 B | 9/2014 |

OTHER PUBLICATIONS

Jianhua Jiang et al., Thermal management of an independent steam reformer for a soild oxide fuel cell with constrained generalized predictive control, International Journal of Hydrogen Energy, 2012, 37, 12317-12331.

Biao Huang et al., Solid oxide fuel cell: Perspective of dynamic modeling and control, Journal of Process Control, 2011, 21, 1426-1437.

Akm M. Murshed et al., Estimation and control of solid oxide fuel cell system, Computers & Chemical Engineering, 2010, 34, 96-111.

Akm M. Murshed et al., Control relevant modeling of planer solid oxide fuel cell system, Journal of Power Sources, 2007, 163, 830-845.

Xiao-juan Wu et al., Dynamic modeling of SOFC based on a T-S fuzzy model, Simulation Modelling Practice and Theory, 2008, 16, 494-504.

Intellectual Property Office ministry of Economic Affairs, R.O.C., "Taiwan Office Action and Search Report for 107141639", Taiwan, dated May 13, 2019.

China Patent Office, 2020102102205390, "Office Action", dated Oct. 26, 2020, China.

* cited by examiner

CONTROLLING METHOD AND DEVICE OF FUEL CELL SYSTEM WITH MULTIPLE STACK TOWERS

CROSS-REFERENCE TO RELATED APPLICATIONS

This non-provisional application claims priority under 35 U.S.C. § 119(a) on Patent Application No(s). 107141639 filed in the Republic of China on Nov. 22, 2018, the entire contents of which are hereby incorporated by reference.

BACKGROUND

1. Technical Field

This disclosure relates to a controlling device of a power supply system and a controlling method thereof, especially for a controlling device of a fuel cell system with multiple stack towers and a controlling method thereof.

2. Related Art

The fuel cell system with multiple stack towers is a type of power supply systems which are capable of providing higher power, and the fuel cell system includes a plurality of fuel cell stacks, and each fuel cell stack is composed of a plurality of fuel cells electrically connected to each other. The fuel cell system can provide higher power by adding the number of fuel cell stacks.

Even if among the same type of the fuel cells, the stability of an individual one is still different from each other, such that when the fuel cells are stacked with each other to form a fuel cell stack, the difference between the stability of one and another becomes greater. Therefore, when an electrochemical reaction take place in the fuel cell system, the difference between the temperature of one of the fuel cell stacks and the temperature of another one of the fuel cell stacks is often excessive, and these situations become more serious when the number of fuel cell stacks becomes more. Due to the excessive difference between the temperature of one of the fuel cell stacks and the temperature of another one of the fuel cell stacks, the overall power efficiency of the fuel cell system is poor.

Therefore, there is indeed a need for an improved controlling device of a fuel cell system and a controlling method thereof, which can at least improve the above disadvantages.

SUMMARY

According to one or more embodiment of this disclosure, a controlling device of a fuel cell system with multiple stack towers is provided. The fuel cell system has a plurality of fuel cell stacks and an air support tube of the fuel cell system is connected to the fuel cell stacks, and the controlling device comprises a temperature sensing equipment, an air flow meter, a processor and a pulse width modulation circuit. The temperature sensing equipment is configured to electrically connect to the fuel cell stacks so as to measure temperatures of the fuel cell stacks. The air flow meter is configured to connect to the air support tube for measuring an air flow rate of the air support tube. The processor is electrically connected to the air flow rate sensor and the temperature sensing equipment, calculates an average temperature of the fuel cell stacks according to the temperature of each of the fuel cell stacks, and selectively adjusts the air flow rate according to the average temperature and the temperature of each of the fuel cell stacks. The pulse width modulation circuit is electrically connected to the processor and the fuel cell stacks, and the processor selectively commands the pulse width modulation circuit to adjust an output current of each of the fuel cell stacks according to the temperature of each of the fuel cell stacks and the average temperature.

According to one or more embodiment of this disclosure, a controlling method of a fuel cell system with multiple stack towers is provided. The fuel cell system has a plurality of fuel cell stacks, and the controlling method comprises: measuring temperatures of the fuel cell stacks; calculating an average temperature of the fuel cell stacks according to the temperatures of the fuel cell stacks; determining whether a difference between the temperature of each of the fuel cell stacks and the average temperature falls within a preset range of average temperature difference; and adjusting an output current of at least one of the fuel cell stacks when the difference between the temperature of the at least one fuel cell stack and the average temperature falls outside the preset range of average temperature difference.

According to one or more embodiment of this disclosure, the controlling method further comprises: determining whether a difference between the average temperature and a preset operating temperature falls within a preset range of operating temperature difference before adjusting the output current of the at least one fuel cell stack, and adjusting an air flow rate of the fuel cell system when the difference between the average temperature and the preset operating temperature falls outside the preset range of operating temperature difference.

BRIEF DESCRIPTION OF THE DRAWINGS

The disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
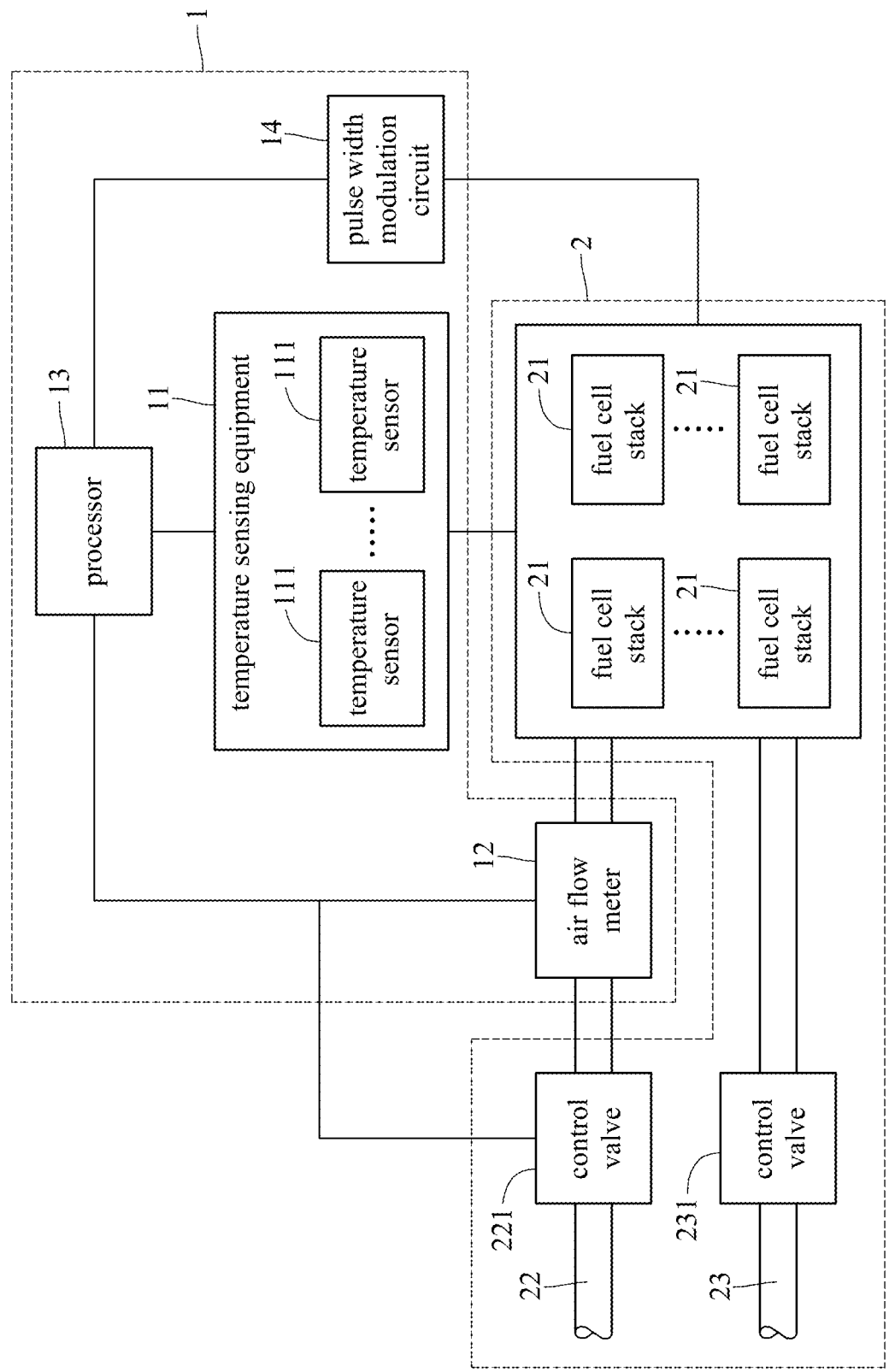
FIG. 1 is a schematic view of a controlling device of a fuel cell system with multiple stack towers according to an embodiment of the disclosure.

Please refer to FIG. 1 which is a schematic view of a controlling device of a fuel cell system with multiple stack towers according to an embodiment of the disclosure. As shown in FIG. 1, the controlling device 1 can be used to control an operating temperature of a fuel cell system 2, an output voltage of the fuel cell system 2 and an output current of the fuel cell system 2, wherein the fuel cell system 2 can comprise a plurality of fuel cell stacks 21 electrically connected to each other, and each of the fuel cell stacks 21 is composed of a plurality of fuel cells electrically connected to each other. Moreover, and fuel cell system 2 further comprises an air supply tube 22 and a fuel supply tube 23. The air supply tube 22 and the fuel supply tube 23 are connected to a cathode of each of fuel cells and the anode of each of the fuel cells through a plurality of manifolds, so that the air supply tube 22 and the fuel supply tube 23 can respectively transmit the air and the fuel to each fuel cell. Two control valves 221, 231 are respectively mounted on the air supply tube 22 and the fuel supply tube 23, and the two control valves 221, 231 are responsible for regulating an air flow rate of the air supply tube 22 and the fuel flow rate of fuel supply tube 23. After the fuel and the air flow into the fuel cell stack 21, an electrochemical process of the fuel cell stack can be performed to generate an electrical energy.

The control device 1 may comprise a temperature sensing equipment 11, an air flow meter 12, a processor 13 and a pulse width modulation circuit 14, the temperature sensing equipment 11 comprises a plurality of temperature sensors 111, and the temperature sensors 111 are respectively connected to the fuel cell stacks 21 and electrically connected to the processor 13. The temperature sensors 111 are respectively used to measure temperatures of the fuel cell stacks 21 and transmit the temperatures of the fuel cell stacks 21 to the processor 13 for calculating an average temperature of the fuel cell system 2. The air flow meter 12 is assembled with the air supply tube 22 for measuring an air flow rate of the air supply tube 22, and the air flow meter 12 is electrically connected to the processor 13 for determining the air flow rate of the air supply tube 22. In this embodiment, the processor 13 may selectively control the control valve 221 assembled with the air supply tube 22 according to the average temperature of the fuel cell system 2 and the temperatures of the fuel cell stacks 21 so as to adjust the air flow rate of the air supply tube 22 and command the pulse width modulation circuit 14 to adjust output currents of the fuel cell stacks 21.

Figure 2:
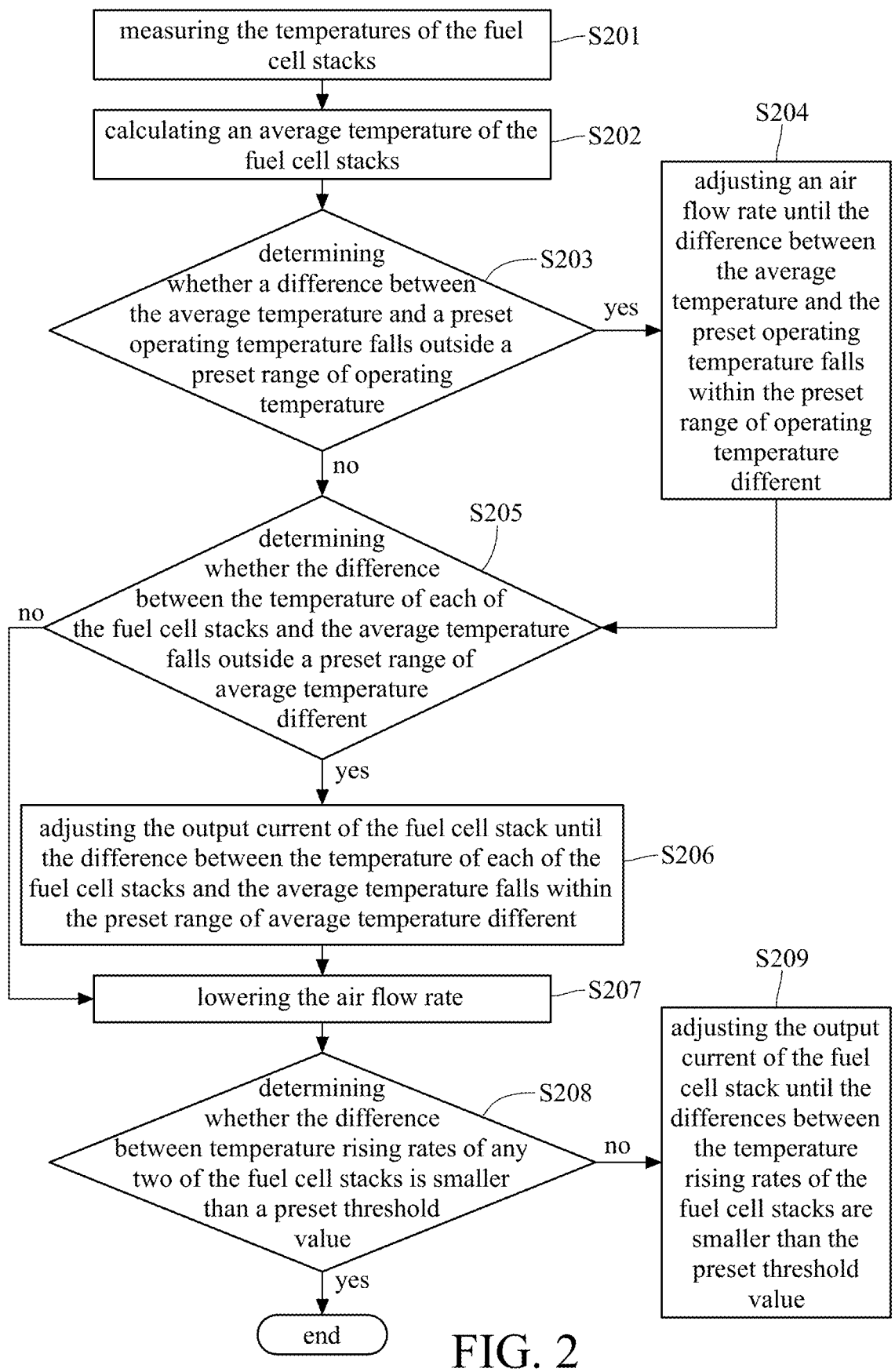
FIG. 2 is a flowchart of a controlling method of a fuel cell system with multiple stack towers according to an embodiment of the disclosure.

FIG. 2 is a flowchart of a controlling method of a fuel cell system with multiple stack towers according to an embodiment of the disclosure. The controlling method is performed by the controlling device 1. The fuel cell system 2 can have multiple voltage output modes. For example, the fuel cell stacks of the fuel cell system 2 have output voltages respectively, or the fuel cell stacks have a common output voltage. The fuel cell stacks having output voltages respectively is disclosed in the following embodiment but is not limited, the controlling method of the disclosure can also be applied to other voltage output modes.

Figure 3:
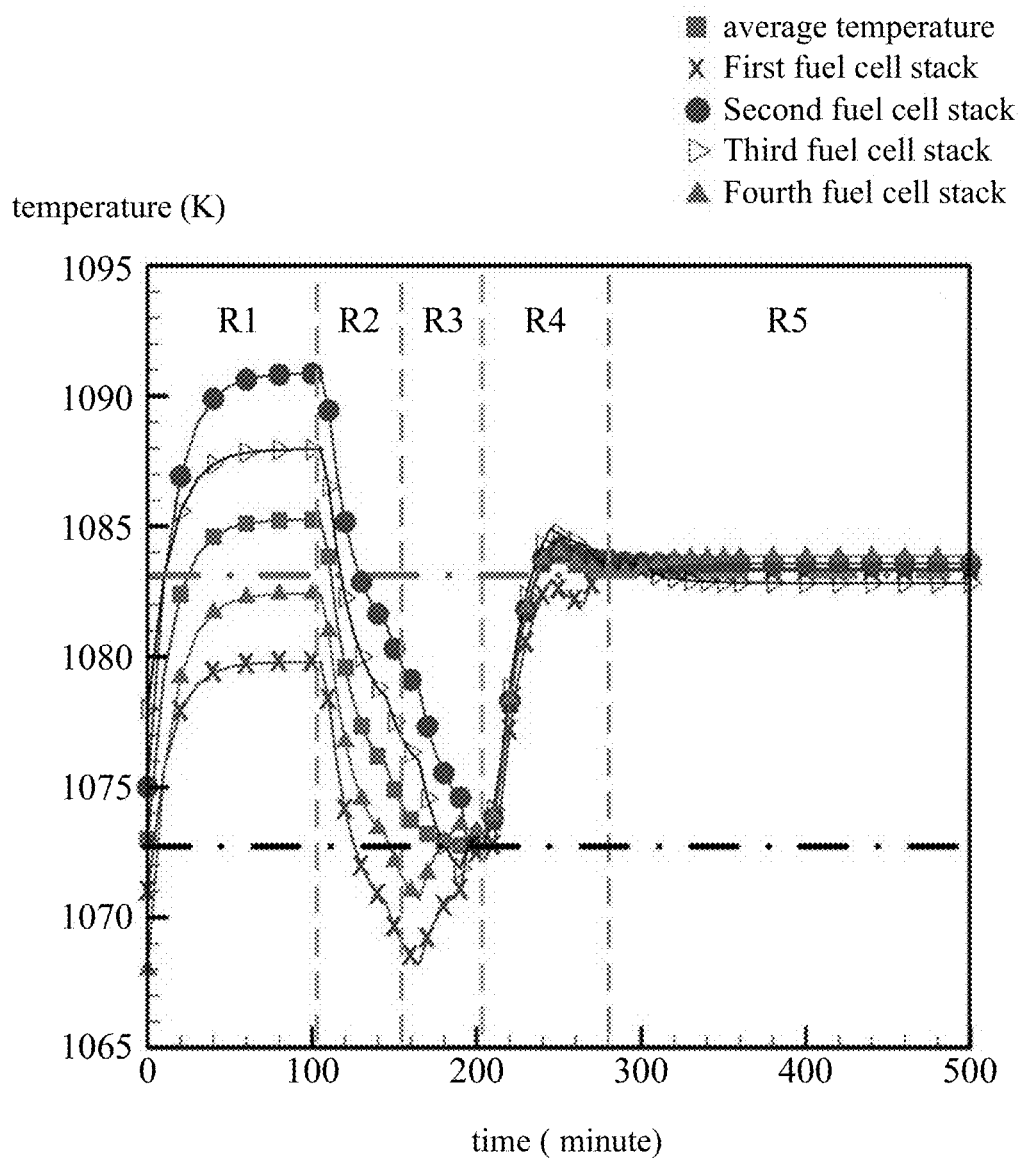
FIG. 3 is a diagram showing temperature curves of multiple fuel cell stacks of a fuel cell system according to an embodiment of the disclosure.

FIG. 3 is a diagram showing temperature curves of multiple fuel cell stacks of a fuel cell system according to an embodiment of the disclosure. Refer to FIG. 2 and FIG. 3, FIG. 3 shows an example of a fuel cell system having four fuel cell stacks, and details the controlling method of the disclosure how to effect the temperatures of the fuel cell stacks. First, refer to a region R1 of FIG. 3, the controlling method first raises the temperature of each fuel cell stacks 21 to be within an effective operating temperature range since the electrochemical process of the fuel cell stack can proceed only when the temperature of each fuel cell stacks 21 raises to be within the effective operating temperature range. However, in the region R1, the differences between the temperatures of the fuel cell stacks 21 and the average temperature are not the same.

In a region R2 of FIG. 3, the controlling method of FIG. 2 begins performing. Step S201 is measuring the temperatures of the fuel cell stacks 21 by the temperature sensors 111 of the temperature sensing equipment 11 respectively. Step S202 is transmitting the temperatures of the fuel cell stacks 21 to the processor 13 by the temperature sensors 111 and calculating an average temperature of the fuel cell stacks 21 by the processor 13 according to the temperatures of the fuel cell stacks 21, wherein the average temperature of the fuel cell stacks 21 is an average temperature of the fuel cell system 2. Step S203 is determining whether a difference between the average temperature of the fuel cell system 2 and a preset operating temperature of the processor 13 falls outside a preset range of operating temperature difference, wherein the preset range of operating temperature difference may include upper and lower limits or may not include the upper and lower limits. When the processor 13 determines that the difference between the average temperature and the preset operating temperature falls outside the preset range of operating temperature difference, step S204 is performed. When the processor 13 determines that the difference between the average temperature and the preset operating temperature falls within the preset range of operating temperature difference, step S205 is performed.

Step S204 is adjusting an air flow rate of the fuel cell system 2 by the processor 13 until the difference between the average temperature of fuel cell system 2 and the preset operating temperature falls within the preset range of operating temperature difference. In detail, when the average temperature of the fuel cell system 2 is higher than the preset operating temperature, the processor 13 raises the air flow rate to take away more heat energy for reducing the average temperature of the fuel cell system 2 until the difference between the average temperature and the preset operating temperature falls within the preset range of operating temperature difference. On the contrary, when the average temperature of the fuel cell system 2 is lower than the preset operating temperature, the processor 13 lowers the air flow rate to raise the average temperature of the fuel cell system 2 until the difference between the average temperature and the preset operating temperature falls within the preset range of operating temperature difference. When the difference between the average temperature and the preset operating temperature falls within the preset range of operating temperature difference, step S205 is performed.

Corresponding to the R2 area of FIG. 3, after performing steps S201-S203, the processor 13 determines that the difference between the average temperature and the preset operating temperature falls outside the preset range of operating temperature difference, and subsequently performs step S204 to lower the temperatures of all the fuel cell stacks 21. After adjusting the air flow rate, the difference between the temperature of each fuel cell stack 21 and the average temperature has been reduced.

Corresponding to a R3 region of FIG. 3, step S205 is determining whether the difference between the temperature of each fuel cell stack 21 and the average temperature of the fuel cell system 2 falls outside a preset range of average temperature difference, wherein the preset range of average temperature difference may include upper and lower limits or may not include the upper and lower limits. The preset range of average temperature difference may be equal or different from the preset range of operating temperature difference. In this embodiment, the preset range of average temperature difference is smaller than the preset range of operating temperature difference. When the processor 13 determines that the difference between the temperature of the at least one fuel cell stack 21 and the average temperature falls outside the preset range of average temperature difference, step S206 is performed. When the processor 13 determines the difference between the temperature of each fuel cell stack 21 and the average temperature falls within the preset range of average temperature difference, step S207 is performed.

Step S206 is commanding the pulse width modulation circuit 14 to adjust the output current of the at least one fuel cell stack 21 by the processor 13 until the difference between the temperature of each fuel cell stack 21 and the average temperature falls within the preset range of average temperature difference. In detail, when the temperature of the at least one fuel cell stacks 21 is higher than the average temperature, the pulse width modulation circuit 14 decreases an output current of the fuel cell stack 21 having a higher temperature for lowering the temperature of the fuel cell stack 21 until the difference between the temperature of the fuel cell stack 21 having a higher temperature and the average temperature of the fuel cell system 2 falls within the preset range of average temperature difference. On the contrary, when the temperature of the at least one fuel cell stacks 21 is lower than the average temperature, the pulse width modulation circuit 14 increases an output current of the fuel cell stack 21 having a lower temperature for raising the temperature of the fuel cell stack 21 until the difference between the temperature of the fuel cell stack 21 having a lower temperature and the average temperature of the fuel cell system 2 falls within the preset range of average temperature difference. When the difference between the temperature of each of the fuel cell stacks 21 and the average temperature of the fuel cell system 2 falls within the preset range of average temperature difference by adjusting the output current, step S207 is performed.

Corresponding to the R3 region of FIG. 3, after performing step S205, the processor 13 determines that the difference between the temperature of the at least one fuel cell stack 21 and the average temperature falls outside the preset range of average temperature difference, and then step S206 is performed. When step S206 is performed, since the temperature of the second fuel cell stack and the temperature of the third fuel cell stack are higher than the average temperature, the pulse width modulation circuit 14 decreases the output current of the second fuel cell stack and the output current of the third fuel cell stack by reducing the duty cycle of the pulse width modulation signal. On the contrary, since the temperature of the first fuel cell stack and the temperature of the fourth fuel cell stack are lower than the average temperature, the pulse width modulation circuit 14 increases the output current of the first fuel cell stack and the output current of the fourth fuel cell stack by increasing the duty cycle of the pulse width modulation signal. After adjusting the output currents of the fuel cell stacks, the difference between the temperature of each fuel cell stack 21 and the average temperature is further reduced.

Corresponding to a R4 region of FIG. 3, after the step S206 is performed, the differences between the temperatures of the fuel cell stacks 21 are reduced, so that the temperature curves of the fuel cell stacks 21 are very similar, and steps S207 to S209 are successively performed. Step S207 is lowering the air flow rate of the fuel cell system 2 by the processor 13 after the pulse width modulation circuit 14 adjusts the output current of at least one fuel cell stack 21 for raising the average temperature of the fuel cell system 2, such that the temperature of each fuel cell stack 21 is raised until the temperature of each fuel cell stack 21 is raised to be within an effective operating temperature range, and then step S208 is performed.

Step S208 is determining whether the difference between temperature rising rates of any two of the fuel cell stacks 21 is smaller than a preset threshold value. When the difference between the temperature rising rates of any two of the fuel cell stacks 21 is smaller than the preset threshold value, the temperature rising rate of the fuel cell system has converged. When the difference between the temperature rising rates of any two of the fuel cell stacks 21 is not smaller than the preset threshold value, step S209 is performed. When the difference between the temperature rising rates of any two of the fuel cell stacks 21 is smaller than the preset threshold value, the controlling method of the disclosure is finished.

Step S209 is adjusting the output current of the at least one fuel cell stack 21 by the pulse width modulation circuit 14 until the differences between the temperature rising rates of the fuel cell stacks 21 are smaller than the preset threshold value. In detail, when the temperature rising rate of the at least one fuel cell stacks 21 is higher and the differences between the temperature rising rate of the fuel cell stack 21 having the higher temperature rising rate and the temperature rising rate of other fuel cell stacks 21 are not smaller than the preset threshold value, the pulse width modulation circuit 14 decreases the output current of the fuel cell stack 21 having the higher temperature rising rate. On the contrary, when the temperature rising rate of the at least one fuel cell stack 21 is lower and the differences between the temperature rising rate of the fuel cell stack 21 having the lower temperature rising rate and the temperature rising rates of other fuel cell stacks 21 are not smaller than the preset threshold value, the pulse width modulation circuit 14 increases the output current of the fuel cell stack 21 having the lower temperature rising rate.

Referring to a region R5 of FIG. 3, after the controlling method of the disclosure adjusts the fuel cell system 2, the temperatures of all the fuel cell stacks 21 even can be raised to an allowable upper limit so that the power efficiency of the fuel cell system 2 is raised by 5% to 10% except that the temperature of all the fuel cell stacks 21 can be raised to be within an effective operating temperature range. On the other hand, the differences between the temperatures of the fuel cell stacks 21 in the region R5 are significantly lower than those in the region R1, and when the temperature uniformity of the fuel cell system 2 is improved, it contributes to increase the power efficiency of the fuel cell system 2. The details of how the pulse width modulation circuit 14 adjusts the output currents of the fuel cell stacks 21 can be refereed to FIGS. 4A-4B, 5A-5B, and 6A-6B below.

FIGS. 4A-4B, 5A-5B, and 6A-6B are schematic views showing the relationships between the output voltages of the fuel cell stacks and the output currents of the fuel cell stacks formed by pulse width modulation signals having different duty cycles. For example, the output voltage of each fuel cell stack 21 is 30V when the circuit is in an open state, the output voltage of each fuel cell stack 21 and the output current of each fuel cell stack 21 are 20V and 20 A when each fuel cell stack 21 is connected to a load. Since the pulse width modulation circuit 14 can adjust the duty cycle of the output voltage and the duty cycle of the output current, the formula of the output voltage of each fuel cell stack 21 is "20V*(duty cycle)+30V*[1−(duty cycle)], and the formula of the output current of the fuel cell stack 21 is "20 A*(duty cycle).

Figure 4A:
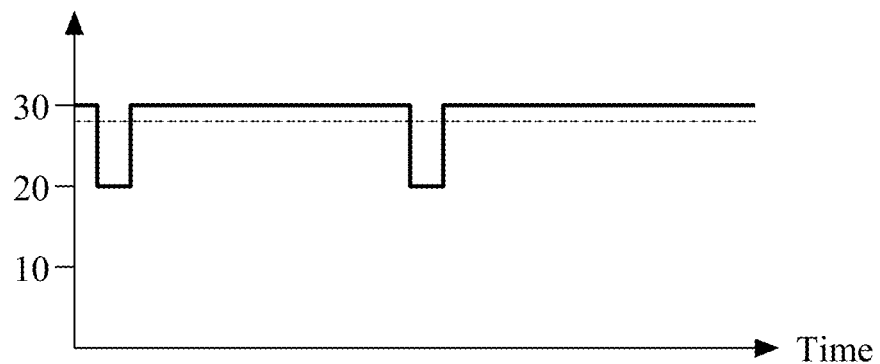
FIGS. 4A-4B are diagrams showing a relationship between a duty cycle, an output voltage of a fuel cell stack and an output current of a fuel cell stack according to a first embodiment of present disclosure.
Figure 4B:
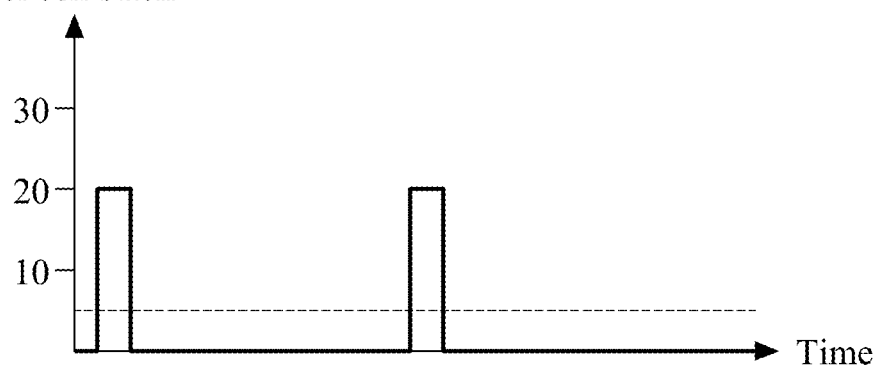
Figure 5A:
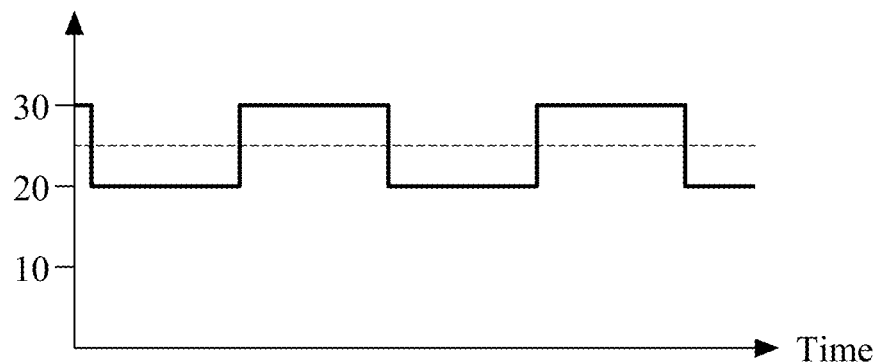
FIGS. 5A-5B are diagrams showing a relationship between a duty cycle, an output voltage of a fuel cell stack and an output current of a fuel cell stack according to a second embodiment of present disclosure.
Figure 5B:
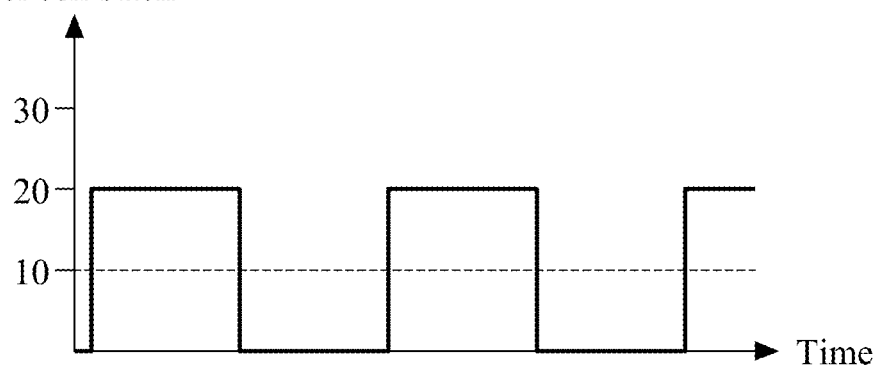
Figure 6A:
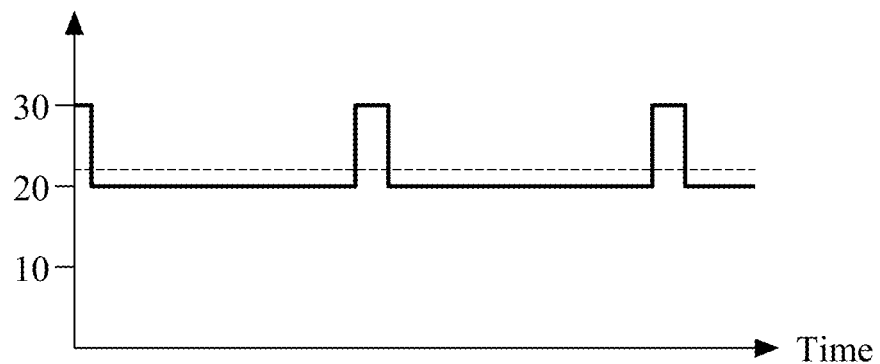
FIGS. 6A-6B are diagrams showing a relationship between a duty cycle, an output voltage of a fuel cell stack and an output current of a fuel cell stack according to a third embodiment of present disclosure.
Figure 6B:
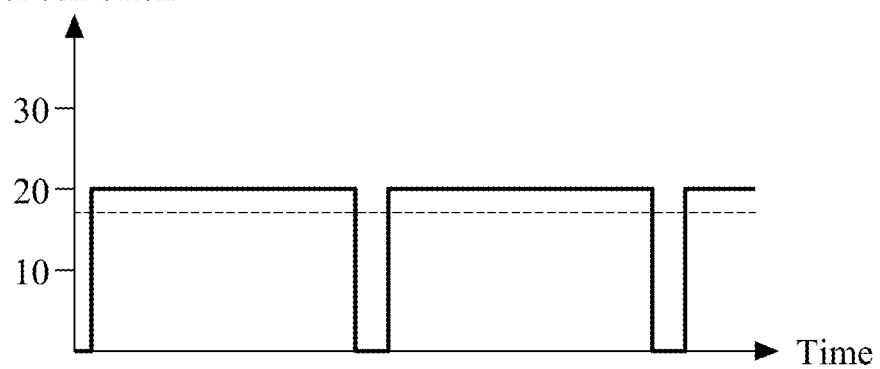

As shown in FIGS. 4A-4B, the duty cycle is 10%, the output voltage of the fuel cell stack 21 is 29V, the output current of the fuel cell stack 21 is 2 A, and output power of the fuel cell stack 21 is 58 W. As shown in FIGS. 5A to 5C, the duty cycle is 50%, the output voltage of the fuel cell stack 21 is 25V, the output current of the fuel cell stack 21 is 10 A, and the output power of the fuel cell stack 21 is 250 W. As shown in FIGS. 6A-6C, the duty cycle is 90%, the output voltage of the fuel cell stack 21 is 21V, the output current of the fuel cell stack 21 is 18 A, and the output power of the fuel cell stack 21 is 378 W. Therefore, the adjustment of the duty cycle indeed changes the output voltage of the fuel cell stack 21, the output current of the fuel cell stack 21, and the output power of the fuel cell stack 21.

Figure 7:
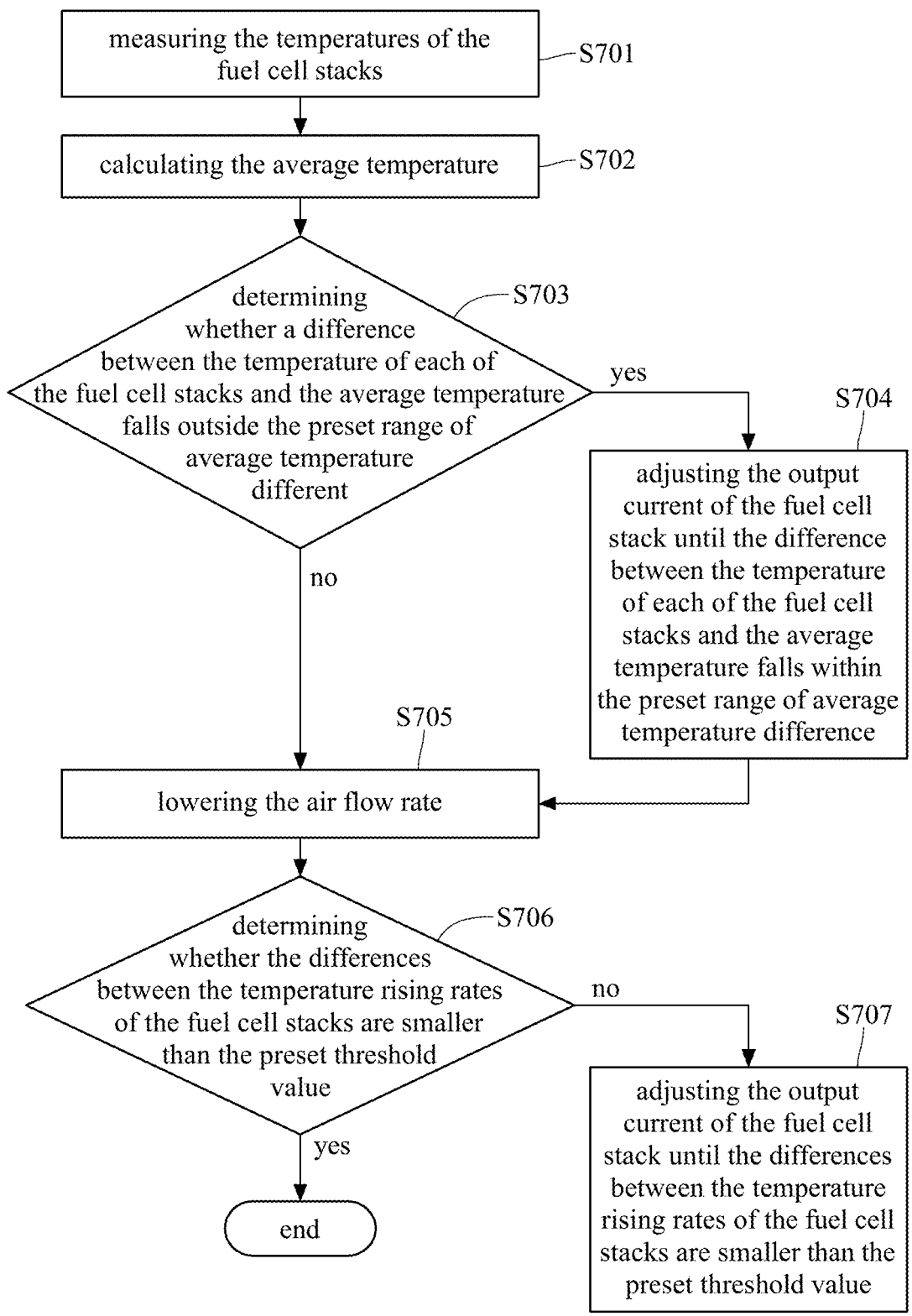
FIG. 7 is a flowchart of a controlling method of a fuel cell system with multiple stack towers according to another embodiment of the disclosure.

FIG. 7 is a flowchart of a controlling method of a fuel cell system with multiple stack towers according to another embodiment of the disclosure. As shown in FIG. 7, step S701 is measuring the temperatures of the fuel cell stacks 21 by the temperature sensing equipment 11. Step S702 is calculating the average temperature of the fuel cell system 2 by the processor 13 based on the temperatures of the fuel cell stacks 21. Step S703 is determining whether a difference between the temperature of at least one of the fuel cell stacks 21 and the average temperature of the fuel cell system 2 falls outside the preset range of average temperature difference. When the processor 13 determines that the difference between the temperature of the at least one fuel cell stack 21 and the average temperature falls outside the preset range of average temperature difference, step S704 is performed. When the processor 13 determines that the difference between the temperature of each fuel cell stack 21 and the average temperature falls within the preset range of average temperature difference, step S705 is performed.

Step S704 is commanding the pulse width modulation circuit 14 to adjust the output current of the at least one fuel cell stack 21 by the processor 13 until the difference between the temperature of each of the fuel cell stacks 21 and the average temperature of the fuel cell system 2 falls within the preset range of average temperature difference. When the difference between the temperature of each of the fuel cell stacks 21 and the average temperature of the fuel cell system 2 falls within the preset range of average temperature difference, step S705 is performed.

Step S705 is lowering the air flow rate of the fuel cell system 2 by the processor 13 after the pulse width modulation circuit 14 adjusts the output current of the at least one fuel cell stack 21 for raising the average temperature of the fuel cell system 2, and then step S706 is performed.

Step S706 is determining whether the differences between the temperature rising rates of the fuel cell stacks 21 are smaller than the preset threshold value by the processor 13. When the difference between the temperature rising rates of any two of the fuel cell stacks 21 are not smaller than the preset threshold value, step S707 is performed. When the differences between the temperature rising rates of all the fuel cell stacks 21 are smaller than the preset threshold value, the controlling method of the disclosure is finished.

Step S707 is adjusting the output current of at least one fuel cell stack 21 by the pulse width modulation circuit 14 until the differences between the temperature rising rates of all the fuel cell stacks 21 are smaller than the preset threshold value.

In view of the above description, when the processor determines that the difference between the average temperature of the fuel cell system and the preset operating temperature falls outside the preset range of average temperature difference, it firstly adjusts the air flow rate of the fuel cell system to reduce the difference between the average temperature and the preset operating temperature and the differences between the temperatures of all the fuel cell stacks. After adjusting the air flow rate, the processor can further adjust the output current of each fuel cell stack to lower the output current of the fuel cell stack having a higher temperature and raise the output current of the fuel cell stack having a lower temperature for reducing the difference between the temperatures of all the fuel cell stacks again. In this way, except that the temperature of all the fuel cell stacks can be raised to be within an effective operating temperature range, and even increased to an allowable upper limit so that the power efficiency of the fuel cell system can be increased by 5% to 10%. Because the differences between the temperatures of all the fuel cell stacks are reduced, the temperature uniformity of the fuel cell system is improved, and the power efficiency of the fuel cell system is also increased due to the improved temperature uniformity.

What is claimed is:

1. A controlling method of a fuel cell system with multiple stack towers, with the fuel cell system having a plurality of fuel cell stacks, with the controlling method comprising:
   measuring temperatures of the fuel cell stacks;
   calculating an average temperature of the fuel cell stacks according to the temperatures of the fuel cell stacks;
   determining whether a difference between the temperature of each of the fuel cell stacks and the average temperature falls within a preset range of average temperature difference;
   adjusting an output current of at least one of the fuel cell stacks when the difference between the temperature of the at least one fuel cell stack and the average temperature falls outside the preset range of average temperature difference; and
   before adjusting the output current of the at least one fuel cell stack, determining whether a difference between the average temperature and a preset operating temperature of the fuel cell system falls within a preset range of operating temperature difference, and adjusting an air flow rate of the fuel cell system when the difference between the average temperature and the preset operating temperature falls outside the preset range of operating temperature difference.

2. The controlling method in claim 1, decreasing the output current of the at least one fuel cell stack when the temperature of the at least one fuel cell stack is higher than the average temperature.

3. The controlling method in claim 1, increasing the output current of the at least one fuel cell stack when the temperature of the at least one fuel cell stack is lower than the average temperature.

4. The controlling method in claim 1, raising the air flow rate of the fuel cell system when the difference between the average temperature and the preset operating temperature falls outside the preset range of operating temperature difference and the average temperature is higher than the preset operating temperature.

5. The controlling method in claim 1, lowering the air flow rate of the fuel cell system when the difference between the average temperature and the preset operating temperature falls outside the preset range of operating temperature difference and the average temperature is lower than the preset operating temperature.

6. The controlling method in claim 1, further comprising lowering the air flow rate of the fuel cell system after adjusting the output current of the at least one fuel cell stack.

7. The controlling method in claim 6, further comprising determining whether a difference between temperature rising rates of any two of the fuel cell stacks is lower than a preset threshold value after lowering the air flow rate, and adjusting the output current of the at least one fuel cell stack when the difference between the temperature rising rates of said any two of the fuel cell stacks is not lower than the preset threshold value.

8. The controlling method in claim 7, decreasing the output current of the at least one of the fuel cell stacks having a higher temperature rising rate when the temperature rising rate of the at least one fuel cell stack is higher than the temperature rising rates of other fuel cell stacks and the differences between the temperature rising rate of the at least one fuel cell stack having the higher temperature rising rate and the temperature rising rates of other fuel cell stacks are not lower than the preset threshold value.

9. The controlling method in claim 7, increasing the output current of the at least one of the fuel cell stacks having a lower temperature rising rate when the temperature rising rate of the at least one fuel cell stack is lower than the temperature rising rates of other fuel cell stacks and the difference between the temperature rising rate of the at least one fuel cell stack having the lower temperature rising rate and the temperature rising rates of other fuel cell stacks are not lower than the preset threshold value.

* * * * *